United States Patent [19]

Kolditz

[11] 4,335,167
[45] Jun. 15, 1982

[54] BRAKE FLUID RESERVOIR COMPRISING POLYMETHYLPENTENE AND 10-20% GLASS FIBERS

[75] Inventor: John W. Kolditz, Alton, Ill.

[73] Assignee: Edison International, Inc., Rolling Meadows, Ill.

[21] Appl. No.: 155,453

[22] Filed: Jun. 2, 1980

[51] Int. Cl.³ .................. B65D 6/34; B32B 27/20; C08K 7/14
[52] U.S. Cl. ........................ 428/35; 73/293; 73/323; 73/327; 73/334; 116/227; 116/276; 220/82 R; 524/579
[58] Field of Search ............ 260/42.18; 73/334, 327, 73/323, 293; 428/35; 116/227, 276; 220/82 R

[56] References Cited

U.S. PATENT DOCUMENTS

| | | | |
|---|---|---|---|
| 3,096,648 | 7/1963 | Dombeck et al. | 73/334 |
| 3,103,816 | 9/1963 | Kawecki | 73/323 |
| 3,962,524 | 6/1976 | Miyamoto et al. | 260/42.18 |
| 4,037,011 | 7/1977 | Hattori et al. | 260/42.18 |
| 4,133,287 | 1/1979 | Downs | 264/136 |
| 4,166,431 | 9/1979 | Pickering | 116/227 |
| 4,207,373 | 6/1980 | Segal | 260/42.18 |

OTHER PUBLICATIONS

Chem. Abst. 6673y, vol. 85 (#2) Dec. 22, 1975, Narita et al., "Glass-Fiber-Reinforced Polycarbonate-Poly(-4-Me-1-Pentene)".

*Primary Examiner*—Herbert J. Lilling
*Attorney, Agent, or Firm*—Jon Carl Gewlow; Ronald J. LaPorte; William H. Wendell

[57] ABSTRACT

An improved brake fluid reservoir is disclosed. The reservoir is made from polymethylpentene and includes 10-20% by weight glass fibers as an opacifying agent. A translucent reservoir is obtained which has the highly desirable feature of visibility of the fluid level in the reservoir without providing a clear view of the fluid.

8 Claims, No Drawings

BRAKE FLUID RESERVOIR COMPRISING POLYMETHYLPENTENE AND 10-20% GLASS FIBERS

The present invention relates to hydraulic brake systems, and, more particularly, to brake fluid reservoirs therefor. The present invention is of particular interest in high temperature applications such as are encountered with off-the-road vehicles.

Brake reservoirs are very well known in the art. They supply brake fluid to the braking system in response to increased need for same from wear of the brake linings. Brake fluid reservoirs have typically been cast metal, both because of its high temperature resistance and its excellent resistance to the corrosive effect of the brake fluid. Because of constant attempts to reduce weight in motor vehicles, attempts have been made to substitute plastic materials for metals in many applications. This has been attempted with brake fluid reservoirs.

In fact, some brake fluid reservoirs have been successfully made from plastic materials, notably nylon and polypropylene. The problem which is encountered is that a very high degree of glass fiber reinforcement is required, on the order of 30% by resin weight or more. This makes it quite an expensive structure.

One of the problems which is always encountered in braking systems is the highly hydroscopic nature of brake fluid. The brake system is kept sealed to prevent the brake fluid from becoming contaminated by airborne moisture. However, the brake fluid reservoir must be opened periodically in order to check on brake fluid level to ensure that it is not too low. When opened, even for short periods of time, moisture enters and is absorbed.

Various attempts have been made to overcome the problem of moisture getting into the brake fluid reservoir during inspection. For example, there are commercially available sensors which constantly monitor brake fluid level in the reservoir. However, reservoirs equipped with these devices are very expensive as compared to reservoirs not so equipped.

It would seem that a good solution would be to form the reservoir either of a transparent material or with a transparant "window" therein. The problem here is that transparency is also not desirable. Brake fluids oxidize as they age. While this oxidation is not harmful to the brake fluid, it does result in a visible change in the brake fluid which can be misconstrued to mean that the brake fluid has gone bad.

With the nylon and polypropylene reservoirs as mentioned hereinbefore, in addition to the high cost of the construction because of the high proportion of glass fibers, the resulting reservoirs are semi-opaque and it is difficult, if not impossible, to see the brake fluid level through the plastic material.

In accordance with the present invention, the applicants have discovered that a brake fluid reservoir made from polymethylpentene resin and from about 10% to about 20% by weight glass fibers, preferably from about 10% to about 15%, has the strength needed to perform as a brake fluid reservoir at high temperatures and has very desirable translucency. In particular, this range of glass fibers yields a brake fluid reservoir which is transparent enough so that the brake fluid level can be readily viewed but is opaque enough so that a change in the brake fluid due to oxidation cannot be seen.

It is necessary that the opacifying agent be glass fibers and not a normal opacifying agent such as pigments or the like. Not only do the glass fibers reinforce the brake fluid reservoir, but they also are not attacked by the brake fluid. This is in counter distinction to pigments and the like which normally are attacked by brake fluid and can leach out and contaminate the brake fluid.

The polymethylpentene polymer is preferably employed as the homopolymer. However, it is permissible to use up to 10% by weight of a copolymerizable monomer such as a polyolefin. The polymethylpentene can also be used in a blend with any polymer which is compatible with it, up to about 10% by weight. When a comonomer is used and the polymethylpentene/monomer copolymer is blended with another polymer (or copolymer) the parts by weight of polymethylpentene in the resin content should not fall below about 90%. As used herein, the term polymethylpentene resin includes polymethylpentene alone or copolymerized and/or blended as set forth hereinbefore.

There is combined with the polymethylpentene resin from about 10% to about 20% by weight of glass fibers. The glass fibers used in the present invention may suitably have a length up to about $\frac{1}{2}$", or possibly even longer. It is preferred that the glass fibers have an average length of less than $\frac{1}{8}$" and fibers having an average length of from about 0.05 to 0.1 inches are most preferred.

The combination of glass fibers and the polymethylpentene resin is formed into a brake fluid reservoir by known techniques. One suitable technique is to admix the polymethylpentene resin and the glass fibers in the barrel of a screw extruder and form pellets therefrom. The pellets can then be fed to an injection molding machine which makes the brake fluid reservoir.

If desired, portions of the brake fluid reservoir may be made of metal. The primary advantage of the present invention is to use the polymethylpentene/glass fiber combination for the main body of the reservoir. The cover may suitably be of metal and, if desired, other components can also be made of metal such as the outlet fitting, etc.

It is also within the contemplation of the present invention that the combination of the polymethylpentene resin and the glass fibers can be used as a "window" in a standard metal brake fluid reservoir or in one of the other types of plastic reservoirs as mentioned hereinbefore. However, the advantages of the present invention are best obtained when the main body section of the brake fluid reservoir is made from the polymethylpentene/glass fiber combination of the present invention.

In one specific example, a brake fluid reservoir was made from a polymethylpentene polymer sold by Mitsui Petrochemical Industries, Ltd. under the trademark TPX. This resin was combined with 10% by weight of milled glass fibers having an average length of about 0.05-0.1 inch. When made into the main body of a brake fluid reservoir, the resulting product was found to withstand an aging test at temperatures up to 360° F. for 156 hours. The reservoir was also found to have excellent translucency in that the brake fluid level could be easily observed, yet the transparency of the reservoir was not such that any oxidation of the brake fluid was noticeable.

It will be understood that various changes and modifications will be apparent to those of ordinary skill in the art. It will thus be appreciated that the claims are intended to cover all changes and modifications of the preferred embodiments of the invention, herein chosen for the purpose of illustration, which do not constitute departure from the spirit and scope of the invention.

What is claimed is:

1. In a brake fluid reservoir for a hydraulic brake system, the improvement comprising at least a portion of said brake fluid reservoir being formed of a composition consisting essentially of polymethylpentene resin and from about 10% to about 20% of glass fibers by weight of the resin.

2. A brake fluid reservoir for a hydraulic brake system, said brake fluid reservoir having a main body portion, said main body portion being formed of a composition consisting essentially of polymethylpentene resin and from about 10% to about 20% glass fibers by weight of the resin.

3. The brake fluid reservoir of claim 2 wherein the polymethylpentene resin includes up to about 10% by weight of a co-monomer compatible with polymethylpentene.

4. The brake fluid reservoir of claim 2 wherein the polymethylpentene resin includes up to about 10% by weight of a polymer blended with polymethylpentene.

5. The brake fluid reservoir of claim 1 wherein the glass fibers have an average length of less than about ⅛".

6. The brake fluid reservoir of claim 5 wherein the glass fibers have an average length of from about 0.05 to about 0.1 inch.

7. The brake fluid reservoir of claim 2 wherein the glass fibers are present in an amount from about 10% to about 15% by weight of the resin.

8. A brake fluid reservoir for a hydraulic brake system, said brake fluid reservoir having a main body portion, said main body portion being composed of polymethylpetene and from about 10% to about 15% glass fibers by weight of the polymethylpentene, said glass fibers having an average length of from about 0.05 inch to about 0.1 inch.

* * * * *